United States Patent
Schoepp

(10) Patent No.: US 7,333,888 B2
(45) Date of Patent: Feb. 19, 2008

(54) VEHICLE NAVIGATION SYSTEM

(75) Inventor: Harald Schoepp, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 246 days.

(21) Appl. No.: 10/882,754

(22) Filed: Jun. 30, 2004

(65) Prior Publication Data

US 2005/0027439 A1 Feb. 3, 2005

(30) Foreign Application Priority Data

Jun. 30, 2003 (EP) ................................. 03014874

(51) Int. Cl.
*G01C 21/00* (2006.01)
(52) U.S. Cl. ............... 701/200; 340/995.1; 340/995.12
(58) Field of Classification Search ............... 701/200, 701/201; 340/995.1, 995.12
See application file for complete search history.

(56) References Cited

U.S. PATENT DOCUMENTS

| | | | |
|---|---|---|---|
| 6,243,030 B1* | 6/2001 | Levine | 340/995.12 |
| 6,253,152 B1* | 6/2001 | Ito | 701/209 |
| 6,694,251 B2* | 2/2004 | Negishi et al. | 701/200 |
| 2002/0091848 A1* | 7/2002 | Agresta et al. | 709/231 |
| 2003/0201912 A1* | 10/2003 | Hashida et al. | 340/995.12 |
| 2004/0251742 A1* | 12/2004 | Runge et al. | 307/10.1 |

* cited by examiner

*Primary Examiner*—Thomas Black
*Assistant Examiner*—Marie A Weiskopf
(74) *Attorney, Agent, or Firm*—Brinks Hofer Gilson & Lione

(57) ABSTRACT

A vehicle navigation system transmits navigation information to a vehicle display in form of video data in a standard video format. The video data may be displayed as a still or a moving image. The vehicle navigation system includes a decoder for decoding and displaying video data and a display that may be interfaced to a vehicle entertainment system. The video data may include map data, user information, directional instructions, video information (still or moving images) or information relating to a destination or point of interest.

36 Claims, 3 Drawing Sheets

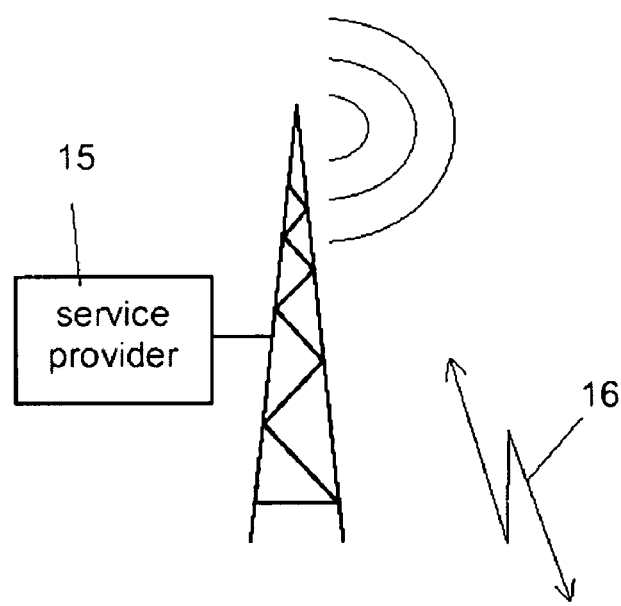
Fig. 3
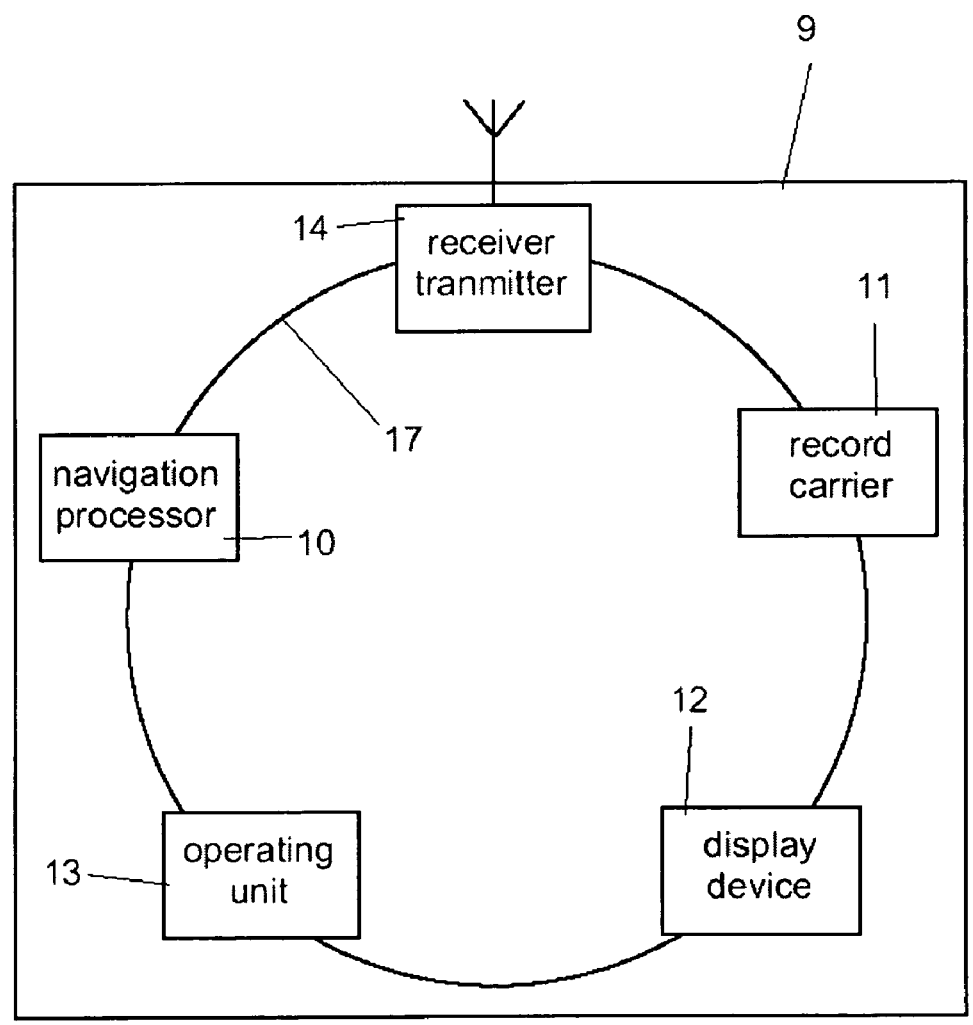

VEHICLE NAVIGATION SYSTEM

PRIORITY CLAIM

This application claims the benefit of European Patent Application No. EP 03014874.6, filed Jun. 30, 2003. The disclosure of the above application is incorporated herein by reference.

BACKGROUND OF THE INVENTION

1. Technical Field

The present invention relates to car navigation and in particular to transmission and display of navigation information.

2. Related Art

Vehicle navigation systems provide information to guide a driver to an intended destination. A position detector obtains information related to the vehicle's position. The position detector may obtain position information using satellite signals. This information is processed by a navigation system that uses mapping data stored in memory. Image data is then generated using stored map data that is transmitted to a display.

The navigation system may provide an optimum route for travelling from a departure point to a destination point. Directional information may be provided through a voice reproduced through a speaker. The navigation system may also transmit digital data that is converted into image data used to display the information to a display. The conversion may be accomplished by a graphic processor that translates image generation instructions into image data.

These graphic processors may not be capable of providing processing capacity as demands for quality and complexity of the displayed image/navigation information increases. Accordingly, there is a need for a vehicle navigation system that may display complex quality images

SUMMARY

The invention provides a vehicle navigation system that provides navigation information through a display. The vehicle navigation system may transmit navigation information to a display in a standardized video format. The vehicle navigation system may interface with entertainment systems that include a decoder for decoding and displaying video data. The vehicle navigation system may enable independent vehicle information to interface on-board and remote entertainment components.

Navigation information may be encoded or compressed by the navigation processor. The encoded image data may be arranged to one or more data formats and may include, for example, map data, user interaction information, directional instructions, video information (still or moving images) of the current environment or any destination point or point of interest along a traveling route, etc. The navigation system may encode image data to be displayed or to convert the navigation information into a standardized format prior to transferring the video data to the display. The transmission may occur between the navigation processor and the display.

The vehicle navigation system may include a memory, or a record carrier for example, that stores data (a map) in a standard video format. The video data may be stored, read and transmitted in one or more standard video formats. A standard video format may replace other map data formats and the memory may include any device that can store and retrieve information, such as a CD-ROM, a DVD, or a flash memory.

The vehicle navigation system may further include a data receiver that receives data in a standard video format. The data may be received from a wireless communication link, such as by UMTS, GSM, or GPRS, EDGE, or the like. The navigation information may be transmitted in a standard video format that integrates a vehicle navigation system to other mobile communication networks and provide a driver with up-to-date navigation information at any time.

Video data may be processed in real-time from a service provider or retrieved from memory. These video data may be transmitted to the display without substantial conversion processing. The retrieved video data may be conveyed to the display without further decoding or encoding.

The navigation information may be transmitted to the display over a vehicle communication network coupled to a navigation processor and the display. Accordingly, a transmission of navigation information may be easily interfaced to existing vehicle entertainment networks. A vehicle communication network may be configured according to a MOST standard and the navigation information may be transmitted in accordance with a MPEG video data format, a H.26x video data format, or a JPEG data format. The navigation processor may transmit navigation information in any one or combination of a plurality of predefined standardized video formats. The navigation processor may then be combined with a variety of displays.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 illustrates a block diagram for a vehicle navigation system.

DETAILED DESCRIPTION OF THE PREFERRED EMBODIMENTS

Figure 1:
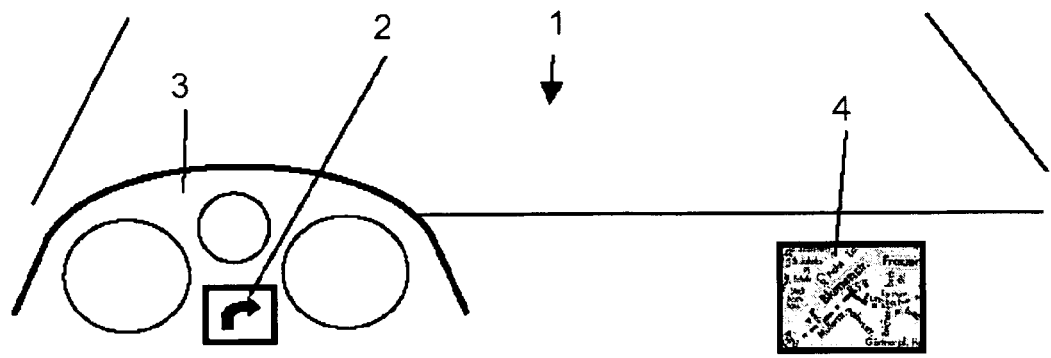
FIG. 1 illustrates displays within a vehicle.

FIG. 1 illustrates a display that displays map data and/or directional commands. A visual output or display 2 is disposed on a dashboard 1 of a vehicle. The display may be a unitary part of the vehicle's instrument panel 3, as shown in the display device 2 or it may be separately coupled to a vehicle as a separate display 4. The vehicle's dashboard 1 may include both displays 2, 4 to provide navigation information on an extended screen or different navigation information. For example, directional instructions may be displayed on the display 2 and detailed information such as a point of interest may be displayed on the display 4.

Figure 2:
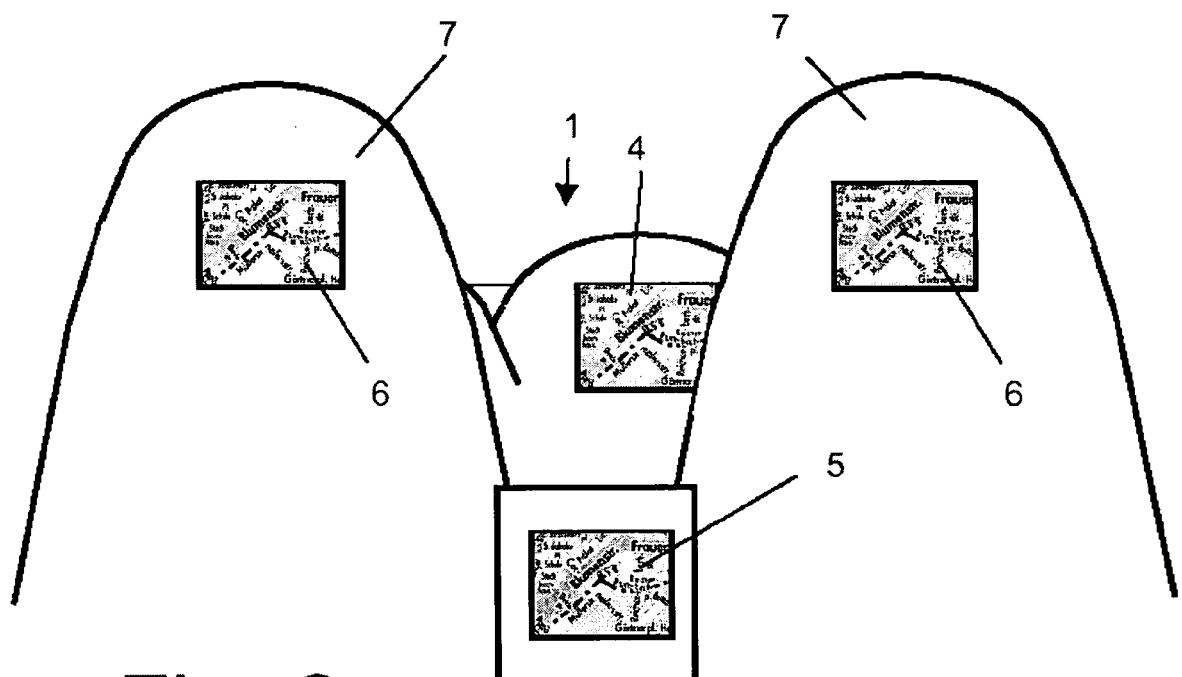
FIG. 2 illustrates alternative display configurations.

Displays may be provided for front-seat passengers and rear-seat passengers. FIG. 2 illustrates displays 4, 5, and 6 in a vehicle. A display 4 may be positioned between two front seats 7. A display 6 may be positioned at a rearward side of the front seats 7. The displays 2, 4, 5, 6 may be a conventional CRT, a flat screen, a liquid crystal display (LCD), plasma display, a LCOS display, a PLP display, or any combination thereof. The displays may also include a GUI (Graphical User Interface) that controls the navigation system or other vehicle systems, such as an on-board TV receiver, mobile phone, or other integrated or separate systems.

The display 2, 4, 5, and 6 may include input or operating devices for entering data to the navigation system. For example, a driver may select a preferred destination point or other map data through an input device such as a keypad, touch screen or touch screen. The input device may include an overlay disposed across the display screen or keys arranged next to the display screen. Each touch pad or key may be a function key, having a predetermined functionality based on the image displayed and/or an operation mode. For example, the user may select scroll or zoom functions for selecting an appropriate portion of the map data to be displayed on the screen.

The displayed data may be transferred as RGB or YUV data. The data may be transferred from a navigation processor to the display 2, 4, 5, and 6. The data may include analog or digital video data. The transmission may occur through dedicated video lines between the navigation processor and the display. The transmission may occur through a wireless communication or other data transmission device. A navigation processor may transmit digital data to the display. The data may be displayed at the display.

FIG. 3 illustrates a service provider and a vehicle navigation system 9. The vehicle navigation system 9 may include a navigation processor 10, an operating unit 13, a display 12, a record carrier 11 and a transceiver 14. The navigation processor may interpret and execute instruction and provide navigation functionalities. The navigation processor 10 may be coupled to an operating unit 13. The operating unit may receive user instructions that control the navigation system. The navigation processor 10 is coupled to a display 12 that displays navigation information to a driver or passengers in a vehicle.

The navigation processor 10 retrieves, interprets, and executes navigation information. For example, the navigation processor 10 may retrieve data from a record carrier 11 map data or video data that is to be displayed on the display 12. The record carrier 11 may include any data storage medium such as an electronic, electromagnetic, magnetic, optical data storage system or any combination thereof. The record carrier may be a CD-ROM, a DVD, a flash memory, a hard disk drive, or any combination thereof.

The transceiver 14 may be coupled to an antenna that receives information transmitted through a wireless communication link 16. The service provider 15 may provide information on the current position or location of the vehicle, provide up-to-date map data information, weather and traffic conditions, points of interest, destinations, or any other information. Information stored in record carrier may be displayed on the display 12. For example, information stored in record carrier 11 may be displayed on display 12 such as when the vehicle is located in an area where map data may not be available.

The transmission of additional map data or navigation from the service provider 15 to the vehicle navigation system 9 may be performed in accordance with a mobile telecommunication standard such as Universal Mobile Telecommunication Standard (UMTS), GSM, General Packet Radio Services (GPRS) or Enhanced Data Rates for GSM Evolution (EDGE). These mobile telecommunication standards are adapted for high data rates to be transmitted to a mobile receiver. The UMTS communication standard may replace a GSM mobile telecommunication system and enable the transmission of high data rates. A GSM based system may have high data transmission rates by employing transmission standards like GPRS or EDGE. These standardized transmission formats allow up to three times higher throughputs compared to some GSM systems using about the same bandwidth.

Transceiver 14 may be adapted to receive additional information from a broadcasting network such as Digital Video Broadcasting (DVB) and/or Digital Audio Broadcasting (DAB) networks. Map data may be transmitted on a particular broadcast channel where either individual data may be transmitted in a customized interval or format upon the driver's request or predefined map data may be broadcasted in a repetitive manner. A broadcast of map data is preferably based on a predefined scheme. Transceiver 14 may also include a transmission unit that may transmit a request. The request may be transmitted to the service provider 15.

The data stored on the record carrier 11 or transmitted via wireless communication link 16 may formatted to a video coding standard. A video coding standard for navigation information enables standardized video processing equipment and storage devices in vehicle navigation systems. By adhering to a standard video format, compatibility of a vehicle navigation system may be assured even when the navigation systems are designed to different standards or protocol.

The vehicle navigation system may use video coding standards from one or more organizations, including the International Telecommunication Union (ITU-T) and the International Standardisation Organisation/International Electrotechnical Commission (ISO-IEC). The ITU-T coding standards are called recommendations and denoted with H.26x (e.g., H.261, H.262, H.263 and H.264). The ISO/IEC standards may be considered a "Motion Picture Experts Group" (MPEG) standard denoted with MPEG-x (e.g., MPEG-1, MPEG-2, MPEG-4 and MPEG-7). These video coding standards have been designed for real time video communication applications and address the needs of video storage, broadcast video and video streaming applications.

The video coding standard MPEG-1 provides communication of video data having an acceptable frame rate and quality image for moving images over a low bandwidth communication in the range of about 1 to about 1.5 MBit/s. The video coding standard MPEG-2 has a similar structure to MPEG-1, and it allows data communication rates up to about 100 MBit/s. The MPEG-2 may be adapted to digital TV, video films on DVD-ROMs and amateur and professional video studios. The video coding standard MPEG-2 allows a scaling of the resolution and data rate over a wide range. The video coding standard MPEG-4 provides high video quality for low data rates in the range between about 10 KBit/s and about 1 KBit/s. The video coding standard MPEG-4 provides an organization of the image contents into independent objects in order to address or process the image objects individually. The latest MPEG family compatible with the vehicle navigation system includes a MPEG-7 standard to describe multimedia data.

The ITU-T standards may be based on similar video coding principles. An intermediate video format that may be used for encoding and transmission of navigation information is the Motion Joint Photographic Experts Group (MJPEG) video standard. The JPEG format may be used to encode still images. The MJPEG format may be considered an intermediate between a still image coding standard such as Joint Photographic Experts Group (JPEG) and a video format like MPEG, as an MJPEG sequence consists of a plurality of JPEG images. The MJPEG standard provides fast access to each individual image, as an individual access may not depend on a previously decoded neighbouring image.

The JPEG format may be considered a lossy compression technique that removes extraneous image data. A JPEG-LS format is a lossless compression technique. JPEG 2000 is coding system based on wavelet technology. Other video data formats relating to a lossless coding of individual images include a bitmap compression (BMP) and the GIF compression. Other video data formats may also be used for transmitting data to the display.

Still images also may be processed by the navigation processor 10. These images may be obtained from the record carrier 11 or from the service provider 15. Such images may be inserted into the video stream in the same video format that they received. The obtained still image information may also be decoded and encoded by the navigation processor. To adapt the information to the display, the encoding may be performed to a particular video coding standard compatible with the display 12. Such a decoding and encoding procedure may be abbreviated through the use of a transcoding technique for transforming the still image data from the obtained video data format into the required encoding video data format.

Corresponding decoding, encoding or transcoding operations may be applied to video sequences (i.e. video clips) obtained from record carrier 11 or service provider 15 for transmission to the display 12. Alternatively, the obtained video sequences may be directly transmitted to the display 12 to be displayed thereon without any further decoding or encoding by the navigation processor 10.

The navigation information may comprise individual images and video clips inserted into a stream of data generated by the navigation processor. Such inserted individual images or image sequences may represent travel information or information relating to particular points of interest along the travelling route of the vehicle.

The navigation processor 10 may retrieve map data from the record carrier 11 of the navigation system 9. The navigation processor 10 also may retrieve map data from service provider 15 via wireless communication link 16. For navigation purposes or for providing additional travel information, map data and/or video images or sequences are retrieved from the stored or received data, processed by navigation processor 10 and transmitted to display 12. The data output by the navigation processor and transmitted to display 12 may be in a data format in accordance with one of the above described video coding standards.

Figure 4:
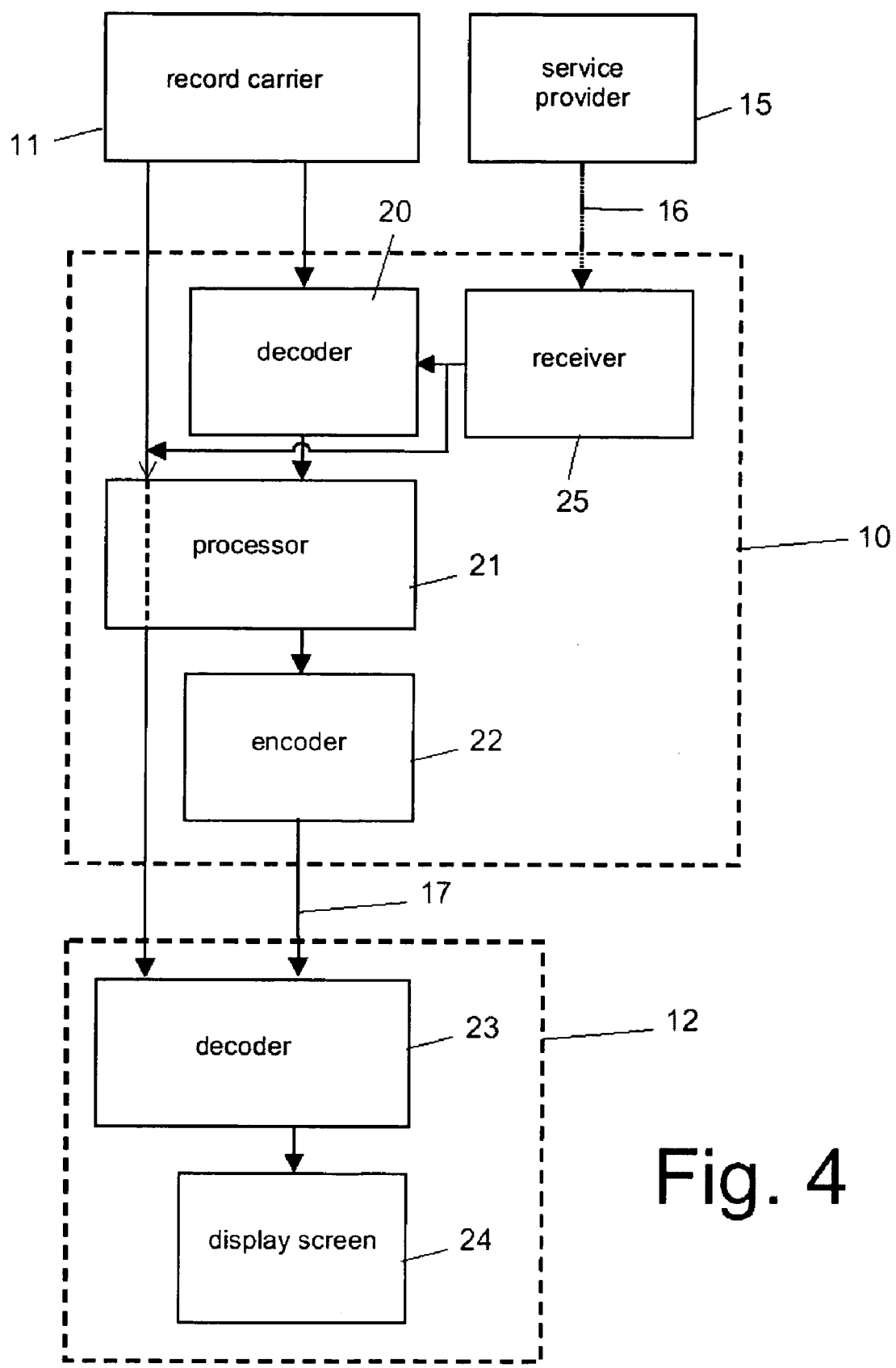
FIG. 4 illustrates a block diagram of the vehicle navigation system of FIG. 3.

FIG. 4 illustrates a diagram for processing map data. The display 12 may include multiple displays distributed within a vehicle. The displays 12 may be equipped with an individual decoding device 23 for decoding the video data. The video data may be transmitted from navigation processor 10 to be displayed on display screen 24.

The display data may be broadcasted, transmitted, communicated, or otherwise carried via a vehicle entertainment and information communication network 17. The display data may have been transmitted by navigation processor 10 in a predefined data format. The navigation processor 10 may include an encoder 22 that converts data generated by processor 21 into the predefined data format.

The processing operation of navigation processor 21 may be based on input data retrieved from record carrier 11. The processing operation of navigation processor 21 also may be based on a wireless communication link 16. For processing and altering the received data by processor 21, the navigation processor 10 may include a decoder 20 to convert received data into 2-dimensional image data suited for image processing. Navigation processor 10 may process any of a variety of input and output (video) data format combinations.

The video information obtained from record carrier 11 and/or service provider 15 may also be selected by processor 21 and forwarded to the display 12 without being decoded and encoded as described.

The data may be transmitted based on a MOST communication network. Data communication on a MOST bus or network is based on predefined frames including a synchronous area and an asynchronous area. The synchronous and asynchronous areas of a frame may have an arbitrary length. The MOST standard also defines an asynchronous packet-transfer mechanism. Each MOST frame may include 512 bits divided into three portions. A first portion having a length of about one byte provides a synchronization administration of the frames. A second portion includes the data to be transmitted, and a last portion having a length of about one byte enables a detection of transmission errors. The remaining 62 bytes may be for data transmission per frame and divided into three different segments for transmission of different types of data, synchronized data, asynchronous data, and control and status data.

Communication networks such as D2B-optical or IEEE 1394 standards may also be used. The IEEE 1394 bus may include a serial bus for transporting all types of digital data. The data are transmitted in a asynchronous transmission mode or an isynchronous transmission mode. The isynchronous mode guarantees a real-time transmission of multimedia data streams.

The vehicle navigation system relates transmission of navigation information to a display in form of video data wherein the video data are in accordance with a standardized video format. The video data may be transmitted at a high transfer rate and thereby provide a high quality video image.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method that transmits navigation information from a navigation processor of an in-vehicle navigation system to a display device within the vehicle, the method comprising:
   generating navigation information using a navigation processor within a vehicle;
   transmitting the navigation information from the navigation processor to a vehicle display within the vehicle, where the navigation information being transmitted comprises video data encoded in a standardized video format;
   decoding the video data received at the display device; and
   displaying the decoded video data representing the navigation information on the display device.

2. The method of claim 1, further comprising:
encoding the generated navigation information for transmission to the display device, the encoding step generating video data encoded in a standardized video format.

3. The method of claim 2, where the standardized video format comprises one of a MPEG-x, H.26x, and JPEG video data formats.

4. The method of claim 3, where the encoding step decodes a plurality of different ones of the standardized video formats.

5. The method of claim 1, where the step of generating the navigation information comprises retrieving stored encoded video data from a memory, the stored encoded video data comprising video data encoded in a standardized video format.

6. The method of claim 5 further comprising:
transmitting the retrieved encoded navigation to the vehicle display.

7. The method of claim 5 where the memory comprises a record carrier.

8. The method of claim 7 where the record carrier comprises a DVD, a CD-ROM, or a Flash-memory system.

9. The method of claim 1 where the encoded navigation information is transmitted to the display device through a vehicle communication network.

10. The method of claim 9 where the vehicle communication network is configured to a MOST standard.

11. The method of claim 9 where the vehicle communication network is configured to an IEEE 1394 standard.

12. The method of claim 1 where the standard video format comprises one of a MPEG-x, H.26x and JPEG video data format.

13. The method of claim 12, where the decoding step decodes a plurality of different ones of the standardized video formats.

14. The method of claim 1, further comprising receiving encoded navigation information from an external source, the encoded navigation information comprising video data encoded in a standardized video format.

15. The method of claim 14 where the external source comprises a service provider.

16. The method of claim 14 where the externally received encoded navigation information is received through a wireless communication link.

17. The method of claim 16 where the externally received encoded navigation information received through the wireless communication link according to standardized mobile communication format.

18. The method of claim 17 where the standard mobile communication format comprises a UMTS standard.

19. An in-vehicle navigation system capable of transmitting navigation information from a navigation processor of the in-vehicle navigation system to a display device within the vehicle, the in-vehicle navigation system comprising:
a navigation processor within a vehicle configured to generate navigation information and transmit the navigation information from the navigation processor to a display device within the vehicle, the navigation information comprising video data encoded in a standardized video format; and
a display device comprising a decoder, the decoder configure to decode the navigation information received at the display device.

20. The in-vehicle navigation system of claim 19 where the navigation processor further comprises an encoder configured to encode the navigation information for transmission to the display device, the encoded navigation information comprising video data encoded in a standardized video format.

21. The in-vehicle navigation system of claim 19 further comprising:
a memory for storing predetermined encoded video data, the stored encoded video data comprising video data encoded in a standardized video format; and
where the navigation processes is configured to generate the navigation information by retrieving the encoded video data stored in the memory.

22. The vehicle navigation system of claim 21 where the memory comprises a record carrier.

23. The vehicle navigation system of claim 22 where the record carrier comprise a DVD, a CD-ROM, or a Flash-memory system.

24. The in-vehicle navigation system of claim 21, where the navigation processor is configured to transmit the retrieved encoded data to the display device.

25. The in-vehicle navigation system of claim 19 where the standardized video format comprises a MPEG-x, an H.26x or a JPEG standard video format.

26. The in-vehicle navigation system of claim 19, where the navigation processor further comprises:
a receiver configured to receive encoded navigation information, the received encoded navigation information comprises video data encoded in a standardized video format.

27. The in-vehicle navigation system of claim 26, where the receiver is configured to receive the encoded navigation information from a service provider.

28. The in-vehicle navigation system of claim 27, where the receiver is configured to receive the encoded navigation information through a wireless communication link.

29. The in-vehicle navigation system of claim 28, where the receiver is configured to receive the encoded navigation information through the wireless communication link according to a standardized mobile communication standard.

30. The in-vehicle navigation system of claim 29, where the standardized mobile communication standard comprises a UMTS standard.

31. The in-vehicle navigation system of claim 19, where the navigation processor is configured to transmit the encoded navigation information to the display device through a vehicle communication network.

32. The in-vehicle navigation system of claim 31 where the communication network is configured to a MOST standard.

33. The in-vehicle navigation system of claim 32, where the decoder is capable to decode a plurality of the standardized video formats.

34. The in-vehicle navigation system of claim 31 where the communication network is configured to an IEEE 1394 standard.

35. The in-vehicle navigation system of claim 19, where the standardized video format comprises a MPEG-x, a H.26x, and a JPEG video data format.

36. The in-vehicle navigation system of claim 35 where the encoder is capable of encoding a plurality of different standardized video formats.

* * * * *